United States Patent
Szeto

(10) Patent No.: US 12,461,868 B2
(45) Date of Patent: *Nov. 4, 2025

(54) INPUT/OUTPUT SEQUENCER INSTRUCTION SET PROCESSING

(71) Applicant: Micron Technology, Inc., Boise, ID (US)

(72) Inventor: Kinyue Szeto, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,574

(22) Filed: Nov. 15, 2023

(65) Prior Publication Data
US 2024/0086344 A1 Mar. 14, 2024

Related U.S. Application Data

(63) Continuation of application No. 17/531,140, filed on Nov. 19, 2021, now Pat. No. 11,853,237.

(51) Int. Cl.
*G06F 13/12* (2006.01)
*G06F 13/16* (2006.01)

(52) U.S. Cl.
CPC ...... *G06F 13/1668* (2013.01); *G06F 2213/16* (2013.01)

(58) Field of Classification Search
CPC .................. G06F 13/1688; G06F 2213/16
See application file for complete search history.

(56) References Cited

U.S. PATENT DOCUMENTS

| | | | | |
|---|---|---|---|---|
| 4,484,303 A * | 11/1984 | Provanzano | ........... | G05B 19/05 700/18 |
| 7,007,132 B2 * | 2/2006 | Soerensen | ............. | G06F 1/3203 711/167 |
| 7,111,125 B2 * | 9/2006 | Hooker | ............... | G06F 9/30032 712/E9.032 |
| 7,266,487 B1 * | 9/2007 | El-Ghoroury | ........... | G06F 30/30 716/105 |
| 8,537,832 B2 * | 9/2013 | Pirog | .................... | G06F 9/3851 710/316 |
| 11,853,237 B2 * | 12/2023 | Szeto | .................. | G06F 13/1668 |
| 2018/0253639 A1 * | 9/2018 | Snelgrove | ........... | G06F 13/4022 |

FOREIGN PATENT DOCUMENTS

CN 100504815 C 6/2009
EP 607988 A1 * 7/1994 ......... G06F 15/8092

* cited by examiner

*Primary Examiner* — Cheng Yuan Tseng
(74) *Attorney, Agent, or Firm* — Lowenstein Sandler LLP

(57) ABSTRACT

A processing device in a memory sub-system retrieves an input/output (IO) instruction of a plurality of IO instructions from an IO instruction memory in the memory sub-system, the IO instruction comprising a first number of bits. The processing device further generates an IO vector based on the IO instruction, the IO vector comprising a second number of bits, wherein the second number of bits is greater than the first number of bits. In addition, the processing device causes a plurality of IO signals, based on the IO vector, to be driven on a signal communication bus to a memory device in the memory sub-system, wherein the plurality of IO signals comprises a number of signals equal to the second number of bits of the IO vector.

20 Claims, 6 Drawing Sheets

INPUT/OUTPUT SEQUENCER INSTRUCTION SET PROCESSING

RELATED APPLICATIONS

This application is a continuation of U.S. patent application Ser. No. 17/531,140, filed Nov. 19, 2021, the entire contents of which are hereby incorporated by reference herein.

TECHNICAL FIELD

Embodiments of the disclosure relate generally to memory sub-systems, and more specifically, relate to input/output (IO) sequencer instruction set processing for memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
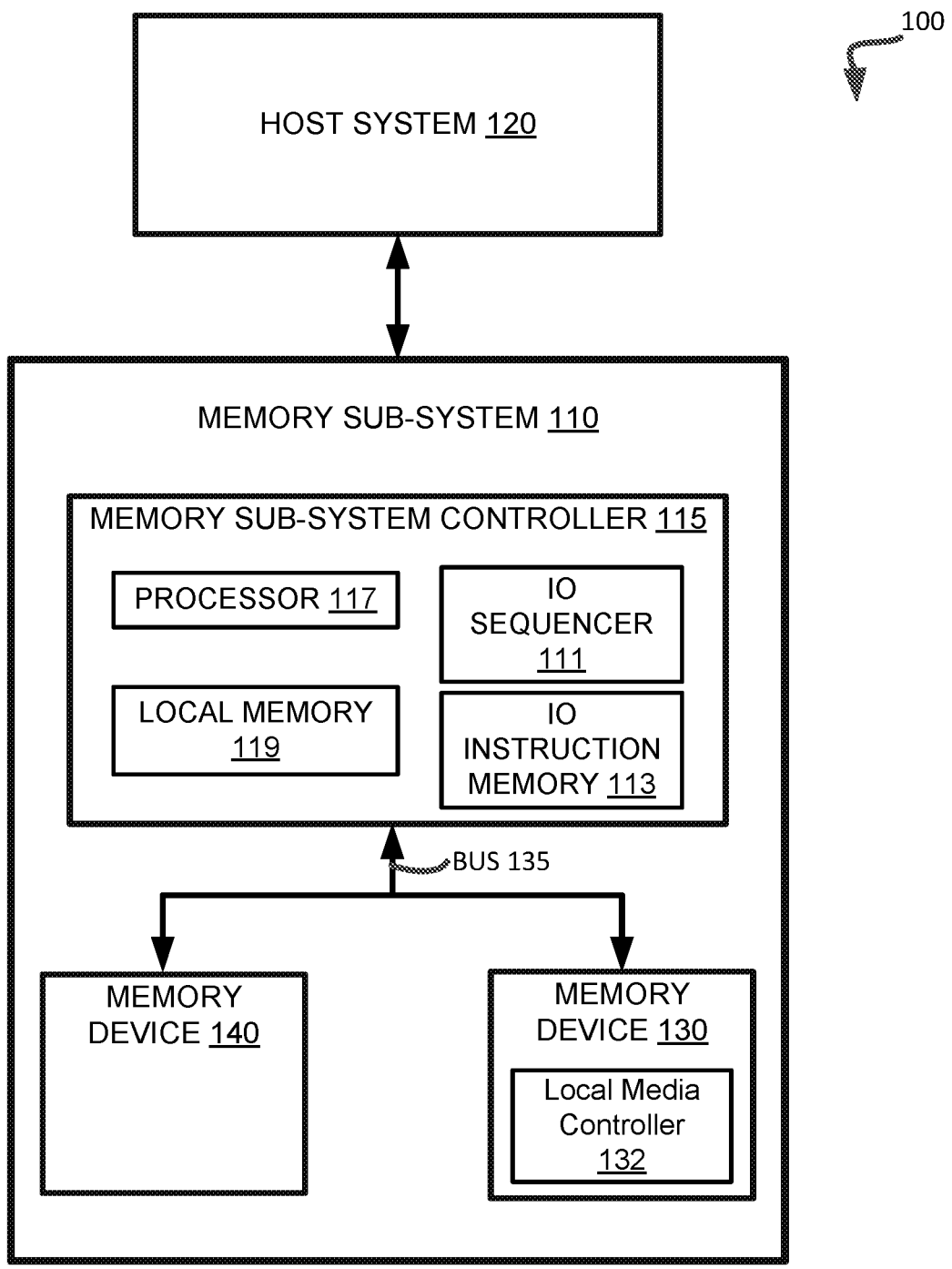
FIG. 1 illustrates an example computing system that includes a memory sub-system in accordance with some embodiments of the present disclosure.

Aspects of the present disclosure are directed to input/output (IO) sequencer instruction set processing for memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Other examples of non-volatile memory devices are described below in conjunction with FIG. 1. A non-volatile memory device is a package of one or more die. Each die can consist of one or more planes. For some types of non-volatile memory devices (e.g., NAND memory devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Memory access commands request the memory device to perform memory access operations. Memory access commands can generally be classified into respective categories, such as read commands, write commands, erase commands, move commands, etc. A memory sub-system controller can receive memory access commands from a host system connected externally to the memory sub-system or can generate memory access commands internally within the memory sub-system. In either case, the memory sub-system controller can provide a number of input/output (IO) signals representing each memory access command to one or more memory devices in the memory sub-system via a corresponding signal communication bus. Depending on the implementation, there can be one or more intermediate components between the memory sub-system controller and the one or more memory devices, such as a physical layer (PHY) for example, and the signal communication bus may be connected tween the memory sub-system controller and such an intermediate component. In operation, the memory sub-system controller can use an IO sequencer to schedule the execution of received memory access commands according to a scheduling scheme. For example, the IO sequencer can maintain a queue of IO vectors corresponding to the memory access commands in an internal IO instruction memory (e.g., an SRAM device), where each IO vector includes a respective bit corresponding to each IO signal to be transmitted across the signal communication bus. Thus, when retrieved from the internal IO instruction memory by the IO sequencer, and optionally loaded into a separate IO buffer, a given IO vector can be used to drive the corresponding IO signals to the appropriate states representing a given memory access command.

Certain memory sub-systems, such as those utilizing 3D cross-point memory devices, utilize a signal communication bus having a relatively large number of IO signals (e.g., 58 signals) in order to support a wide range of memory access commands. In such a situation, a relatively long IO vector would be used to drive the IO signals, thus requiring a relatively wide internal IO instruction memory. In addition, depending on the workload in the memory sub-system, there may often be a relatively high number of IO vectors stored in the internal IO instruction memory waiting to be processed. Cost considerations and physical space requirements in the memory sub-system controller, however, drive a preference for a smaller internal IO instruction memory both in width (e.g., 32 bits wide) and having a limited number of entries (e.g., 512 entries). An internal IO instruction memory of this limited size is not capable of storing a large number of IO vectors, each having one bit associated with each IO signal in the signal communication bus.

Certain memory sub-systems attempt to utilize an internal IO instruction memory of this limited size with the larger signal communication bus by implementing complex encoding schemes for groups of bits in the IO vectors. These encoding schemes utilize fixed hardware components that are not able to be updated for changing communication protocols and are subject to coding errors, making them less reliable than directly controlled IO vectors. The added complexity of the encoding schemes is also inefficient in terms of code size, and to support a wide range of memory access commands, such as those used for 3D cross-point memory devices, would likely still exceed the capacity of a limited size internal IO instruction memory.

Aspects of the present disclosure address the above and other deficiencies by implementing a microcontroller-based IO sequencer for IO instruction set processing in a memory sub-system. In one embodiment, instead of retrieving an IO vector from the internal IO instruction memory and using that IO vector to directly drive the IO signals across the signal communication bus, the microcontroller-based IO sequencer retrieves an IO instruction from the internal IO instruction memory, where the IO instruction has a fixed number of bits to match the limited width of the internal IO instruction memory, and uses that IO instruction to generate a longer IO vector which can be used to drive the IO signals across the signal communication bus to one or more memory device or intermediate components. The microcontroller-based IO sequencer can interpret the limited number of bits in an IO instruction using a defined structure to determine how to generate the corresponding IO vector. The defined structure of the IO instruction can provide for direct control of a certain number of IO signals (e.g., three IO pairs), while also providing for repeating IO signals for a certain number of clock cycles and looping a set of IO signals after a certain number of clock cycles. Unless certain IO signals are changed, as specified in a certain IO instruction, the microcontroller based IO sequencer can maintain the IO signals in the same state from one clock cycle to the next.

Advantages of this approach include, but are not limited to, improved performance in the memory sub-system. The above-described features of the defined structure allow an IO instruction of a smaller size (e.g., 32 bits) capable of being stored in an internal IO instruction memory having a fixed size, to control a larger number of IO signals (e.g., 58 signals) that make up a signal communication bus in the memory sub-system. The IO instructions allow for a unified interface exposed to the host system/user, and prevents the need for complex encoding schemes. In addition, the IO instructions can be easily updated to support future communication protocols without requiring new hardware. Furthermore, since an IO instruction is only used when one or more of the IO signals change state (e.g., shift from high to a low or vice versa), the number of IO instructions used to process the same number of memory access commands is decreased, allowing all of the IO instructions to fit comfortably within an internal IO instruction memory having a fixed size. This provides both cost and area savings in the memory sub-system controller.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells, such as memory array 137. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controller 132 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 132) for media management within the same memory device package. An example of a managed memory device is a managed NAND (MNAND) device.

In one embodiment, the memory sub-system 110 includes a microcontroller-based IO sequencer 111 to perform IO instruction set processing of IO instructions stored in IO instruction memory 113. In some embodiments, the memory sub-system controller 115 includes at least a portion of the microcontroller-based IO sequencer 111. For example, the memory sub-system controller 115 can include a processor 117 (processing device) configured to execute instructions stored in local memory 119 for performing the operations described herein. In some embodiments, the microcontroller-based IO sequencer 111 is part of the host system 110, an application, or an operating system. Depending on the embodiment, IO instruction memory 113 can be either part of or separate from local memory 119 and can be implemented using, for example, SRAM, DRAM or some other volatile memory technology.

In certain embodiments, IO sequencer 111 can retrieve IO instructions from IO instruction memory 113 and uses those IO instructions to generate IO vectors used to drive IO signals across a signal communication bus, such as bus 135, to memory devices 130 and 140 or to other intermediate components. In one embodiment, the IO instructions have a fixed number of bits to match the limited width of the IO instruction memory 113, where that number of bits is less than a number of IO signals sent via signal communication bus 135. IO sequencer 111 can interpret the limited number of bits in the IO instructions using a defined structure to determine how to generate the corresponding IO vectors. The defined structure of the IO instruction can provide for direct control of a certain number of IO signals (e.g., three IO pairs), while also providing for repeating IO signals for a certain number of clock cycles and looping a set of IO signals after a certain number of clock cycles. Unless certain IO signals are changed, as specified in a certain IO instruction, the microcontroller based IO sequencer can maintain the IO signals in the same state from one clock cycle to the next. Further details with regards to the operations of IO sequencer 111 are described below.

Figure 2:
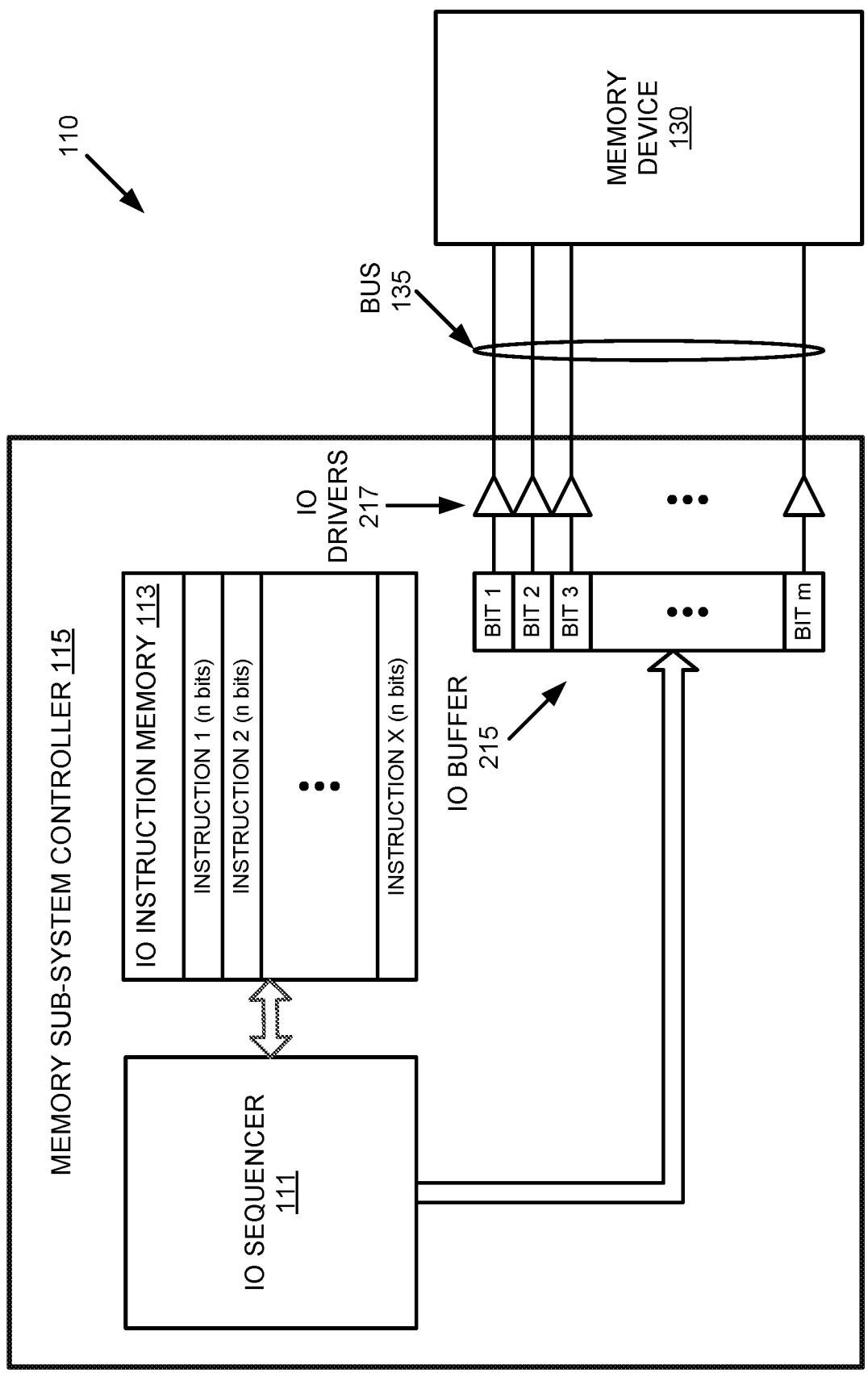
FIG. 2 is a block diagram illustrating a memory sub-system implementing IO sequencer instruction set processing in accordance with some embodiments of the present disclosure.

FIG. 2 is a block diagram illustrating a memory sub-system 110 implementing IO sequencer instruction set processing in accordance with some embodiments of the present disclosure. As described above, the memory sub-system 110 includes memory sub-system controller 115 which is coupled to another system component via a signal communication bus 135, such as an NVMe bus or DDR PHY Interface (DFI) bus. Depending on the embodiment, the system component can be memory device 130, for example, a physical layer (PHY) component, or some other component external to the memory sub-system controller 115. In one embodiment, the signal communication bus 135 includes a defined number of individual signal lines on which a separate IO signal can be transmitted. In one embodiment, the signal lines of signal communication bus 135 are arranged in a number of IO pairs (i.e., sets of two corresponding signal lines). In one embodiment, the number of individual signal lines of signal communication bus 135 is fixed and defined according to an industry standard. In one embodiment, for example, signal communication bus 135 includes 58 individual signal lines. In other embodiments, however, signal communication bus 135 can includes some other number of signal lines.

In one embodiment, memory sub-system controller 115 includes IO sequencer 111 and internal IO instruction memory 113. IO sequencer 111 can be, for example, a microcontroller-based sequencer component that includes processing logic configured to execute a number of programed operations according to received input (e.g., from a host system 120). In one embodiment, IO sequencer 111 can manage internal IO instruction memory 113 (e.g., an SRAM device). Cost considerations and physical space requirements in the memory sub-system controller 115 can lead to internal IO instruction memory 113 having a limited size, both in width (e.g., 32 bits wide) and in the number of entries (e.g., 512 entries). In other embodiments, internal IO instruction memory 113 can have another width and/or depth, however, in general, the data width of internal IO instruction memory 113 is less than the number of signal lines in signal communication bus 135. In one embodiment, internal IO instruction memory 113 stores a number of IO instructions which IO sequencer 111 can retrieve and use to generate corresponding IO vectors used to drive the IO signals on the signal lines of signal communication bus 135. The IO instructions can include, for example, control instructions and/or data instructions. In one embodiment, the resulting IO vectors include one bit corresponding to each signal line of the signal communication bus 135. The size of the IO instructions that can be stored in IO instruction memory 113 is limited by the data width of IO instruction memory 113. For example, if IO instruction memory 113 has a data width of n bits, the IO instructions stored therein are limited to n bits in length. If the signal communication bus 135 has m signal lines, an IO vector that is m bits in length can be used to drive the IO signals on signal communication bus 135. Thus, IO sequencer 111 can retrieve an IO instruction that is n bits in length from IO instruction memory 113 and use that IO instruction to generate an IO vector that is m bits in length, where m is greater than n.

In one embodiment, IO sequencer 111 can load the generated IO vector into temporary storage, such as in IO buffer 215 of memory sub-system controller 115. As described above, the IO vector can be value m bits in length, where each bit defines a state of a respective IO signal to be driven on a corresponding signal line of signal communication bus 135. A set of IO drivers 217 can generate IO signals having the respective states based on the bit values of the IO vector in IO buffer 215 and drive the IO signals across the signal lines of signal communication bus 135 (e.g., to memory device 130 or some other system component).

Figure 3:
FIG. 3 is a block diagram illustrating the structure of an IO control instruction in accordance with some embodiments of the present disclosure.

FIG. 3 is a block diagram illustrating the structure of an IO instruction 300 in accordance with some embodiments of the present disclosure. In one embodiment, IO instruction 300 is a control instruction, which can be stored, for example, as part of a sequence of IO instructions in IO instruction memory 113. As illustrated, IO instruction 300 is a 32 bit long (i.e., bits [31:0]) value having a defined structure including a number of different fields. In other embodiments, IO instruction 300 can have some other number of bits and/or can have a different structure including a different arrangement of fields. As described herein, IO sequencer 111 can interpret the bits in IO instruction 300 using a defined structure to determine how to generate a corresponding IO vector. In one embodiment, defined structure of the IO instruction 300 can provide for direct control of a certain number of IO signals (e.g., three IO pairs), while also providing for repeating IO signals for a certain number of clock cycles and looping a set of IO signals after a certain number of clock cycles. Unless certain IO signals are changed, as specified in IO instruction 300, IO sequencer 111 can maintain the IO signals in the same state from one clock cycle to the next.

In one embodiment, IO instruction 300 includes one bit (e.g., BIT[31]) which is the most significant bit (MSB) 302 in the IO instruction. When set to a certain state (e.g., a logical one or high state) the MSB 302 indicates that IO instruction 300 is a control instruction. When set to another state (e.g., a logical zero or low state) the MSB 302 indicates that IO instruction 300 is not a control instruction (e.g., is a data instruction having a different defined structure). In one embodiment, IO instruction 300 includes one bit (e.g., BIT[30]) referred to as the loopback (LBCK) target bit 304. When set to a certain state (e.g., a logical one or high state) the loopback target bit 304 indicates that IO instruction 300 marks the start of a loop of instructions to which IO sequencer can jump back until a loopback count has been reached. When set to another state (e.g., a logical zero or low state) the loopback target bit 304 indicates that IO instruction 300 is not a loopback target instruction. In one embodiment, IO instruction 300 includes one bit (e.g., BIT[29]) referred to as the loopback enable (LBCK_EN) bit 306. When set to a certain state (e.g., a logical one or high state) the loopback enable bit 306 indicates that IO instruction 300 marks the end of a loop of instructions being repeated until the loopback count has been reached. When set to another state (e.g., a logical zero or low state) the loopback enable bit 306 indicates that IO instruction 300 is not at the end of the loop and that the IO instruction 300 is to be repeated according to a repeat count.

In one embodiment, IO instruction 300 includes a field formed from a number of bits (e.g., BIT[28:18]) referred to as the repeat or loopback count field 308. When set to a certain state (e.g., all logical zeros or low states) the repeat or loopback count field 308 indicates that there is no repeat or loopback operation being performed. When set to another state (e.g., a non-zero state) the value in the repeat or loopback count field 308 indicates one or a repeat count or a loopback count, depending on a state of the loopback enable bit 306. If the loopback enable bit 306 is set to zero, for example, the repeat or loopback count field 308 represents a repeat count indicating how many times IO instruction 300 is to be repeated. In one embodiment, at least one bit in repeat or loopback count field 308 can define a unit of time used to measure the repeat period (e.g., according to clock cycles of a clock used for signal communication bus 135 or a standardize time unit, such as 1 microsecond). If the loopback enable bit 306 is set to one, for example, the repeat or loopback count field 308 represents a loopback count indicating the number of times the loop of instructions is to be repeated. Thus, together, the loopback target bit 304 (marks the start of the loop), the loopback enable bit 306 (marks the end of the loop), and the repeat or loopback count field 308 specify whether the IO sequencer 111 is to at least one of a repeat of a previous IO vector or a loopback of a plurality of previous IO vectors.

In one embodiment, IO instruction 300 additional includes a number of fields 310, 312, 314 to directly control respective states of a subset of bits of the IO vector to be generated. For example, if the respective states of the subset of bits are different than corresponding states of those bits in a previous IO vector, the values in field 310 (e.g., BIT[17:12]), field 312 (e.g., BIT[11:6], and field 314 (e.g., BIT[5:0]) can be used to set the corresponding bits in the IO vector, and thus, the corresponding IO signals, to a defined states. In one embodiment, the values in each of fields 310, 312, and 314 can include a first number of bits that identify a particular IO signal for which the state is to be changed, and a second number of bits that indicate the value to which the stated is to be changed (or values if the field represents an IO signal pair). An example of how IO instruction 300 can be used is described with respect to FIG. 4.

Figure 4:
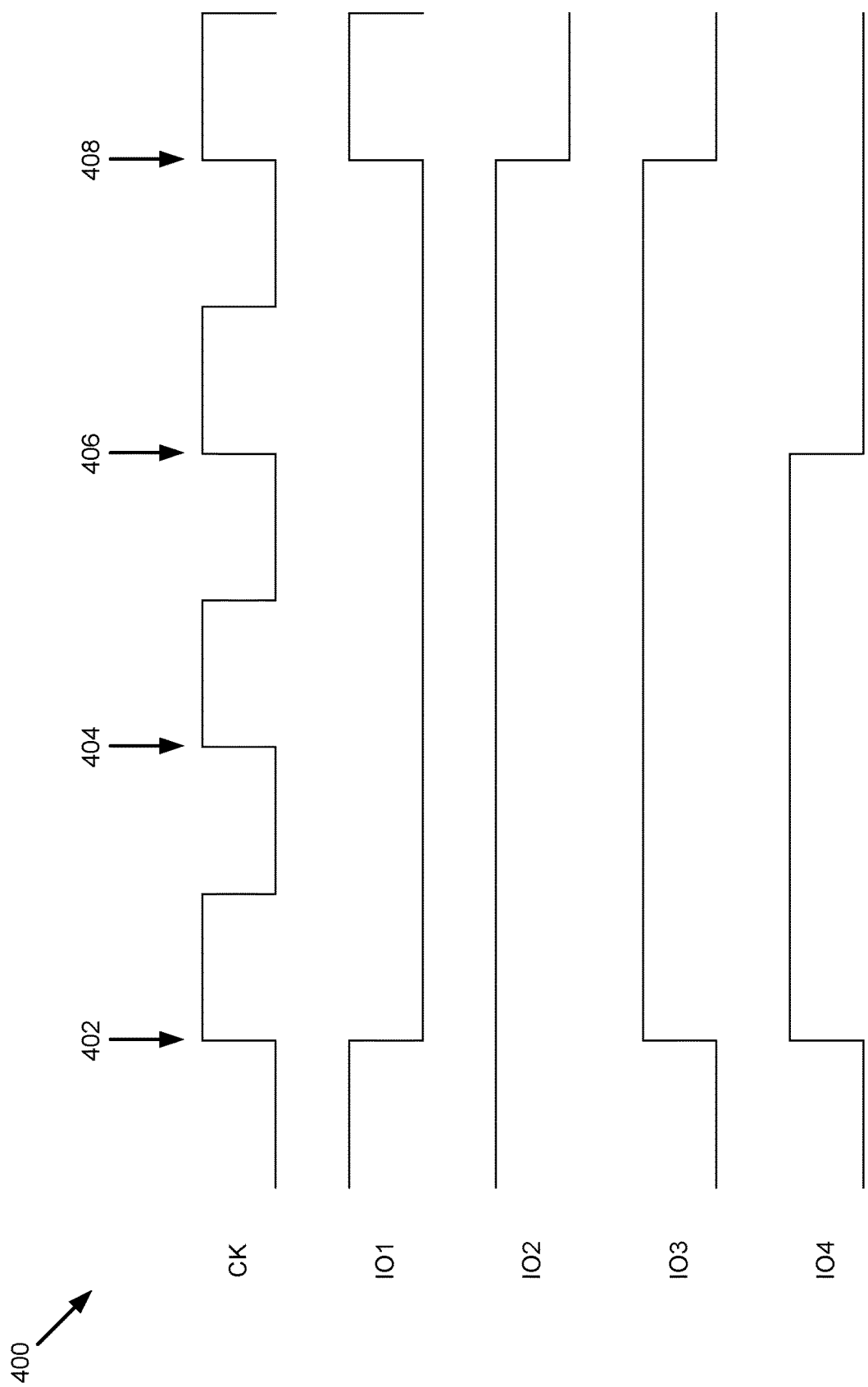
FIG. 4 is a timing diagram illustrating IO sequencer instruction set processing in accordance with some embodiments of the present disclosure.

FIG. 4 is a timing diagram 400 illustrating IO sequencer instruction set processing in accordance with some embodiments of the present disclosure. Diagram 400 illustrates a clock signal CK used to drive a number of IO signals IO1, IO2, IO3, and IO4 across a signal communication bus. For example, IO signals IO1, IO2, IO3, and IO4 can be representative of certain IO signals to be driven across signal communication bus 135. As described herein, the state of each IO signal can be defined according to a corresponding bit in an IO vector. Such an IO vector can be generated by IO sequencer 111 according to an IO instruction retrieved from IO instruction memory 113. The generated IO vector can indicate the respective states of a number of IO signals for a certain period of time (e.g., one cycle of clock signal CK). Thus, a series of IO commands can be created and stored in IO command memory 113, which can then be utilized by IO sequencer 111 to generate a number of IO vectors that will result in the IO signals illustrated in diagram 400 being driven across signal communication bus 135. In the example illustrated in diagram 400, there can be one IO vector corresponding to each cycle of clock signal CK, the start of which can be represented by times 402, 404, 406, and 408. Depending on whether the respective states of the various IO signals change from one cycle to the next, the IO vectors applied at times 402, 404, 406, and 408 can be generated by IO sequencer 111 using fewer IO commands than there are generated IO vectors. That is, a single IO command can be used to generate two or more IO vectors.

In one embodiment, IO sequencer 111 functions according to the premise that unless an IO command specifies that a particular IO signal is to change state, that particular IO signal will retain the same state as from a previous clock cycle. Thus, at time 402, IO signals IO1, IO3, and IO4 are to change state, while IO signal IO2 is to remain at the same state as a previous clock cycle (not shown). In order to achieve these states, an IO command, such as IO command 300 can be generated where fields 310, 312, and 314 include respective indications (e.g., unique identifiers) of IO signals IO1, IO3, and IO4, as well as respective indications of the states to which IO signals IO1, IO3, and IO4 are to be changed. IO sequencer 111 can retrieve such an IO instruction from IO instruction memory 113 and generate a corresponding IO vector with the respective states of IO signals IO1, IO3, and IO4. Since IO signal IO2 is not indicated in the IO instruction, IO sequencer 111 can maintain the previous state of IO signal IO2 when generating the IO vector.

At time 404, none of the states of the IO signals are to change. Accordingly, the IO command 300 can utilize the repeat feature to avoid having to create a separate IO command corresponding to the states of the IO signals at time 404. For example, the same IO command 300 that set the state of the IO signals at time 402 can also have the loopback enable bit 306 set to zero to indicate that the IO command 300 is to be repeated, and the repeat or loopback count field 308 can include a value indicating a count of two (2) clock cycles, since the same IO signals are to be repeated during times 402 and 404. Thus, IO sequencer 111 can read the IO command 300 and generate identical IO vectors representing the states of the IO signals for times 402 and 404. At time 406, the state of IO signal IO4 is to change, so a new IO command can be created indicating the IO signal IO4 and the desired state. A similar process can occur to achieve the states of the IO signals at time 408.

Although not illustrated, if for example, the states of the IO signals at times 402, 404, 406, and 408 were to be repeated during subsequent cycles of clock CK, the IO command could utilize the loopback feature to avoid having to create additional IO commands. For example, the IO command 300 corresponding to time 402 could have the loopback target bit 404 set to one to indicate that the IO command is the start of the loop, the loopback enable bit 306 set to one to indicate that the IO command is part of a loop, and the repeat or loopback count field 308 can include a value indicating a count of four (4) clock cycles, since the same IO signals driven at times 402, 404, 406, and 408 are to be repeated during four subsequent clock cycles.

Figure 5:
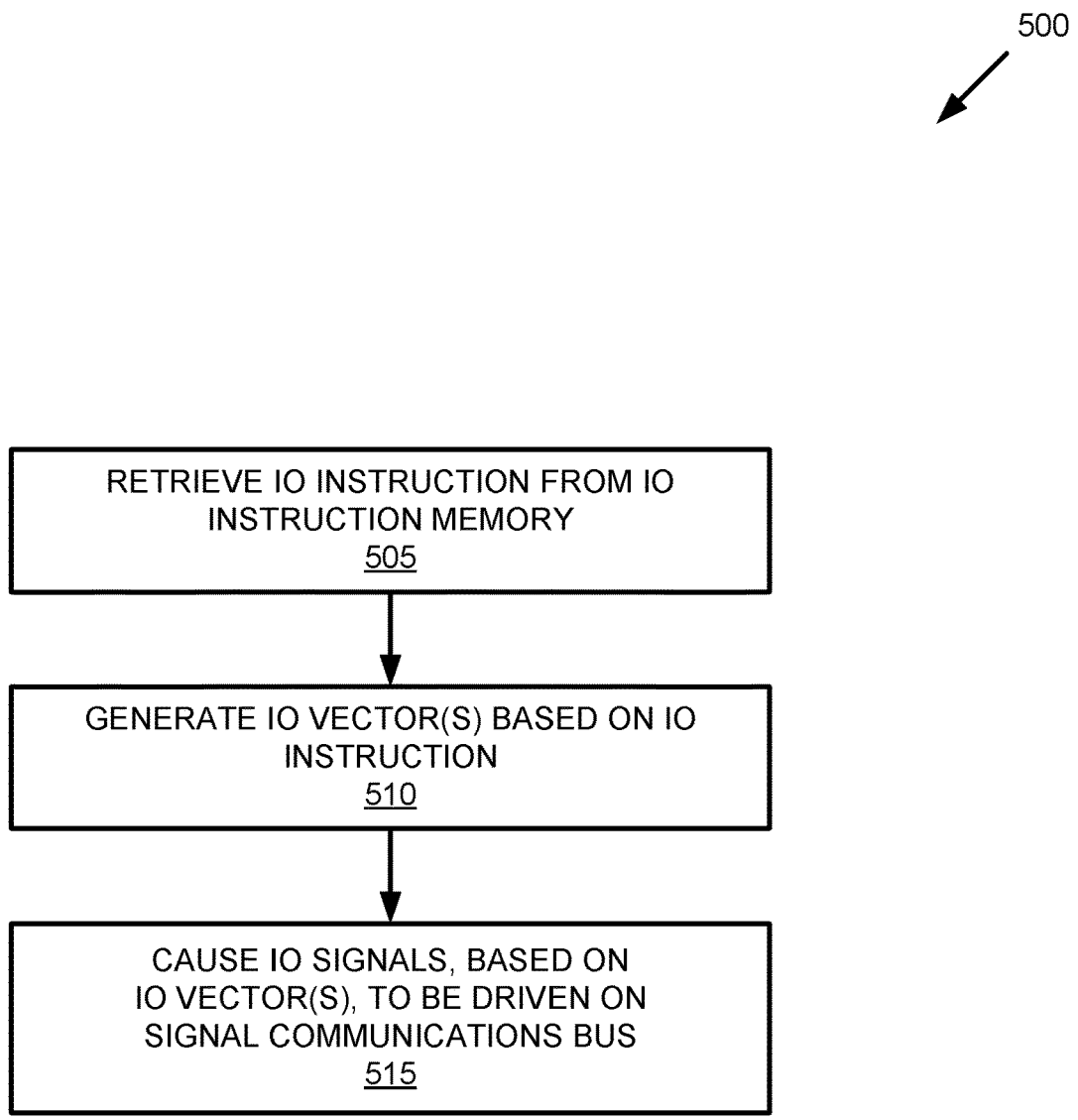
FIG. 5 is a flow diagram of an example method of IO sequencer instruction set processing in accordance with some embodiments of the present disclosure.

FIG. 5 is a flow diagram of an example method of IO sequencer instruction set processing in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by IO sequencer 111 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic retrieves an IO instruction of a plurality of IO instructions from an IO instruction memory. In one embodiment, IO sequencer 111 retrieves the IO instruction, such as IO instruction 300, from IO instruction memory 113. In one embodiment, the IO instruction includes a first number of bits (e.g., n bits) and the IO instruction memory 113 has a data width equal to the first number of bits of the IO instruction. Depending on the embodiment, the IO instruction can include at least one of a control instruction or a data instruction. As described above, a control instruction can be used to directly specify the states of the IO signals to be driven on signal communication bus 135. In one embodiment, there is a one-to-one correspondence between control instructions and resulting IO vectors (e.g. one control instructions is used to generate one IO vector). A data instruction, however, can be used to generate a series of command or data signals on the signal communication bus 135. In one embodiment, a single data instruction can be used to generate multiple IO vectors that represent the series of command or data signals. For example a single data instruction can be used to generate the IO vectors used to perform a read operation on memory device 130 (e.g., using a read memory command). Another data instruction can be used to generate IO vectors used to load the read memory command into internal registers. In one embodiment, the data instruction can specify destination IO sequencer registers for storing the read memory command, as well as the addresses of memory device 130 to be read. Another data instruction can be used to generate IO vectors used to drive the read memory command on signal communication bus 135. Another data instruction can be used to generate IO vectors used to retrieve the data from memory device 130 and store the data in a read data register. With both control instructions and data instructions, IO sequencer 111 can execute all of the associated cycles of the appropriate memory communication protocol (e.g., a 3DXP protocol).

At operation 510, the processing logic generates an IO vector based on the IO instruction. In one embodiment, IO sequencer 111 generates the IO vector using the defined fields in the IO instruction, where the IO vector has a second number of bits (e.g., m bits), that is greater than the first number of bits in the IO instruction. For example, the IO instruction 300 (e.g., a control instruction) can include a number of fields (e.g., fields 310, 312, and 314) to directly control respective states of a subset of the second number of bits of the IO vector. In one embodiment, the respective states of that subset of the second number of bits of the IO vector are different than corresponding states of the subset of the second number of bits of a previous IO vector. In addition, the IO instruction 300 can include a number of fields (e.g., fields 304, 306, and 308) to specify whether to at least one of (a) repeat a previous IO vector or (b) loopback a plurality of previous IO vectors for the second number of bits of the IO vector. Depending on the nature of IO signals to be driven over a signal communication bus, the IO sequencer can generate multiple IO vectors based on a single IO instruction, as described above.

At operation 515, the processing logic causes a plurality of IO signals, based on the IO vector, to be driven on a signal communication bus to a memory device or other system component. In one embodiment, the plurality of IO signals comprises a number of signals (e.g., m signals) equal to the second number of bits of the IO vector, such that each bit of the IO vector represents the state of a respective IO signal. In one embodiment, IO sequencer 111 writes the IO vector to an IO buffer 215, accessible by a number of IO drivers 217 which can drive the IO signals at their respective states across the signal lines of signal communication bus 135. In an embodiment, where multiple IO vectors are generated from a single IO instruction, each IO vector can be used to drive a corresponding set of IO signals on the signal communication bus 135.

Figure 6:
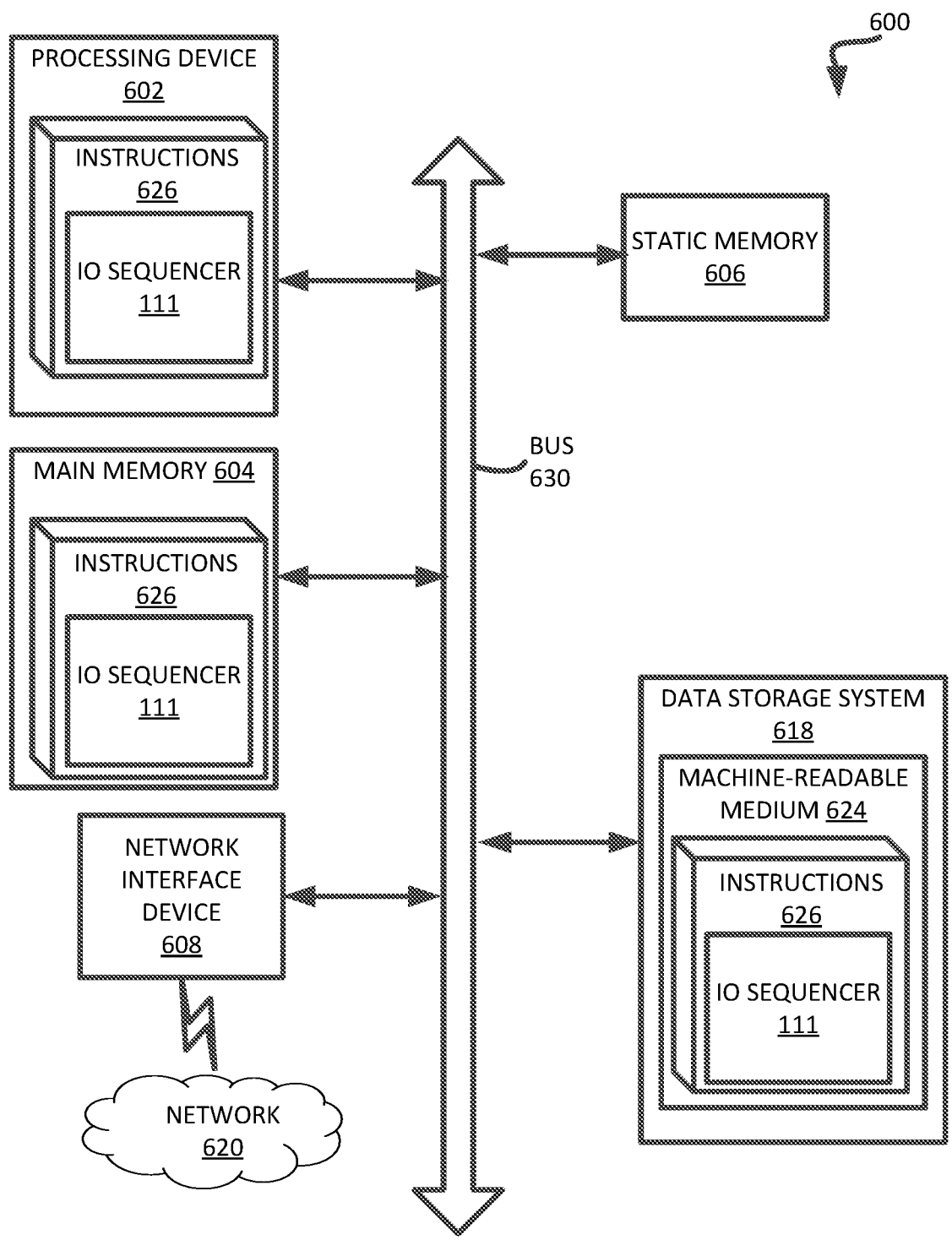
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the IO sequencer 111 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the IO sequencer 111 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device;
an input/output (IO) instruction memory; and
a processing device, operatively coupled with the memory device via a signal communication bus, to perform operations comprising:
retrieving a single IO instruction of a plurality of IO instructions from the IO instruction memory, the single IO instruction comprising a first number of bits;
generating a temporal sequence of two or more IO vectors based on the single IO instruction, each IO vector in the temporal sequence comprising a second number of bits and used to drive a plurality of IO signals on the signal communication bus to control communication signals to the memory device over successive time periods, wherein the second number of bits is greater than the first number of bits, and wherein each IO vector in the temporal sequence comprises a first subset of bits in a different state from a corresponding first subset of bits in a previous IO vector in the temporal sequence; and
causing the plurality of IO signals, based on the temporal sequence of IO vectors, to be driven on the signal communication bus to the memory device, wherein the plurality of IO signals comprises a number of signals equal to the second number of bits of each IO vector in the temporal sequence.

2. The system of claim 1, wherein the IO instruction memory has a data width equal to the first number of bits of the single IO instruction.

3. The system of claim 1, wherein the single IO instruction comprises at least one of a control instruction or a data instruction.

4. The system of claim 3, wherein the control instruction comprises a number of fields to directly control respective states of a second subset of the second number of bits of each IO vector in the temporal sequence, the second number of bits corresponding to a subset of the plurality of IO signals.

5. The system of claim 4, wherein the respective states of the second subset of the second number of bits of each IO vector in the temporal sequence are different than corresponding states of the second subset of the second number of bits of a previous IO vector in the temporal sequence.

6. The system of claim 3, wherein the control instruction comprises a number of fields to specify whether to at least one of repeat a previous IO vector in the temporal sequence or loopback a plurality of previous IO vectors in the temporal sequence for the second number of bits of each IO vector in the temporal sequence.

7. The system of claim 1, wherein the processing device is to perform operations further comprising:
causing multiple pluralities of IO signals, based on the temporal sequence of IO vectors, to be driven on the signal communication bus to the memory device.

8. The system of claim 1, wherein the memory device comprises a three-dimensional cross-point array of non-volatile memory cells.

9. A method comprising:
retrieving a single input/output (IO) instruction of a plurality of IO instructions from an IO instruction memory, the single IO instruction comprising a first number of bits;
generating a temporal sequence of two or more IO vectors based on the single IO instruction, each IO vector in the temporal sequence comprising a second number of bits and used to drive a plurality of IO signals on a signal communication bus to control communication signals to a memory device over successive time periods, wherein the second number of bits is greater than the first number of bits, and wherein each IO vector in the temporal sequence comprises a first subset of bits in a different state from a corresponding first subset of bits in a previous IO vector in the temporal sequence; and
causing the plurality of IO signals, based on the temporal sequence of IO vectors, to be driven on the signal communication bus to the memory device, wherein the plurality of IO signals comprises a number of signals equal to the second number of bits of each IO vector in the temporal sequence.

10. The method of claim 9, wherein the IO instruction memory has a data width equal to the first number of bits of the single IO instruction.

11. The method of claim 9, wherein the single IO instruction comprises at least one of a control instruction or a data instruction.

12. The method of claim 11, wherein the control instruction comprises a number of fields to directly control respective states of a second subset of the second number of bits of each IO vector in the temporal sequence, the second number of bits corresponding to a subset of the plurality of IO signals.

13. The method of claim 12, wherein the respective states of the second subset of the second number of bits of each IO vector in the temporal sequence are different than corresponding states of the second subset of the second number of bits of a previous IO vector in the temporal sequence.

14. The method of claim 11, wherein the control instruction comprises a number of fields to specify whether to at least one of repeat a previous IO vector in the temporal sequence or loopback a plurality of previous IO vectors in the temporal sequence for the second number of bits of each IO vector in the temporal sequence.

15. The method of claim 9, further comprising:
causing multiple pluralities of IO signals, based on the temporal sequence of IO vectors, to be driven on the signal communication bus to the memory device.

16. The method of claim 9, wherein the memory device comprises a three-dimensional cross-point array of non-volatile memory cells.

17. A non-transitory computer-readable storage medium storing instructions which, when executed by a processing device, cause the processing device to perform operations comprising:
retrieving an a single input/output (IO) instruction of a plurality of IO instructions from an IO instruction memory, the single IO instruction comprising a first number of bits;
generating a temporal sequence of two or more IO vectors based on the single IO instruction, each IO vector in the temporal sequence comprising a second number of bits and used to drive a plurality of IO signals on a signal communication bus to control communication signals to a memory device over successive time periods, wherein the second number of bits is greater than the first number of bits, and wherein each IO vector in the temporal sequence comprises a first subset of bits in a different state from a corresponding first subset of bits in a previous IO vector in the temporal sequence; and causing the plurality of IO signals, based on the temporal sequence of IO vectors, to be driven on the signal communication bus to the memory device, wherein the plurality of IO signals comprises a number of signals equal to the second number of bits of each IO vector in the temporal sequence.

18. The non-transitory computer-readable storage medium of claim 17, wherein the IO instruction memory has a data width equal to the first number of bits of the single IO instruction.

19. The non-transitory computer-readable storage medium of claim 17, wherein the single IO instruction comprises at least one of a control instruction or a data instruction.

20. The non-transitory computer-readable storage medium of claim 19, wherein the control instruction comprises a number of fields to directly control respective states of a second subset of the second number of bits of each IO vector in the temporal sequence, the second number of bits corresponding to a subset of the plurality of IO signals.

* * * * *